United States Patent
Li et al.

(10) Patent No.: US 12,538,230 B2
(45) Date of Patent: Jan. 27, 2026

(54) METHOD FOR INDICATING POWER SAVING MODE, TERMINAL, AND NETWORK SIDE DEVICE

(71) Applicant: VIVO MOBILE COMMUNICATION CO., LTD., Dongguan (CN)

(72) Inventors: Dongru Li, Dongguan (CN); Xueming Pan, Dongguan (CN); Dajie Jiang, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 557 days.

(21) Appl. No.: 17/970,548

(22) Filed: Oct. 20, 2022

(65) Prior Publication Data

US 2023/0049043 A1 Feb. 16, 2023

Related U.S. Application Data

(63) Continuation of application No. PCT/CN2021/087732, filed on Apr. 16, 2021.

(30) Foreign Application Priority Data

Apr. 22, 2020 (CN) .......................... 202010323911.3

(51) Int. Cl.
*H04W 52/02* (2009.01)
*H04W 72/23* (2023.01)
*H04W 76/28* (2018.01)

(52) U.S. Cl.
CPC ....... *H04W 52/0235* (2013.01); *H04W 72/23* (2023.01); *H04W 76/28* (2018.02)

(58) Field of Classification Search
CPC ....... H04W 52/0206–0296; H04W 72/00–569; H04W 76/00–50; H04L 1/1822–1864; Y02D 30/70
See application file for complete search history.

(56) References Cited

U.S. PATENT DOCUMENTS

| 2018/0160370 A1* | 6/2018 | Alpert | ............... H04W 52/0225 |
| 2018/0198594 A1 | 7/2018 | Tiirola et al. | |
| 2021/0195517 A1* | 6/2021 | Yang | ................. H04W 52/0212 |

FOREIGN PATENT DOCUMENTS

| CN | 110557813 A | 12/2019 |
| CN | 110896558 A | 3/2020 |
| WO | 2019160903 A1 | 8/2019 |
| WO | 2019192002 A1 | 10/2019 |

(Continued)

OTHER PUBLICATIONS

William Strunk, Jr. & E. B. White, The Elements of Style 27 (4th ed. 2000) (Year: 2000).*

(Continued)

*Primary Examiner* — Ronald Eisner
(74) *Attorney, Agent, or Firm* — IPX PLLC

(57) ABSTRACT

A method for indicating a power saving mode, a terminal, and a network side device are provided. The method includes: receiving first Downlink Control Information (DCI), where the first DCI is DCI that is not used for scheduling data, and the first DCI is used to indicate a first cell of the terminal to switch to or activate a target power saving mode.

20 Claims, 4 Drawing Sheets

(56) References Cited

FOREIGN PATENT DOCUMENTS

WO 2020037319 A1 2/2020
WO 2020055556 A1 3/2020

OTHER PUBLICATIONS

Cambridge Dictionary meaning of "when", printed on Jul. 18, 2023. Retrieved from Internet: <https://dictionary.cambridge.org/us/dictionary/english/when> (Year: 2023).*
International Search Report issued in corresponding International Application No. PCT/CN2021/087732, mailed Jun. 30, 2021, 6 pages.
First Office Action issued in related Chinese Application No. 202010323911.3 mailed Feb. 28, 2022, 10 pages.
CMCC, Discussion on PDCCH-based power saving signal/channel design, 3GPP TSG RAN WG 1 #97, RI-1906524, Apr. 30, 2019, 10 pages.
Huawei et al, Remaining issues on PDCCH based power saving, 3GPP TSG RAN WG1 Meeting #100bis-e, R1-2001539, Apr. 11, 2020, 10 pages.
CATT, CR for DCI based BWP switch delay due to cross slot scheduling, 3GPP TSG-RAN4 Meeting #94-e, R4-2000578, Feb. 14, 2020, 3 pages.

* cited by examiner

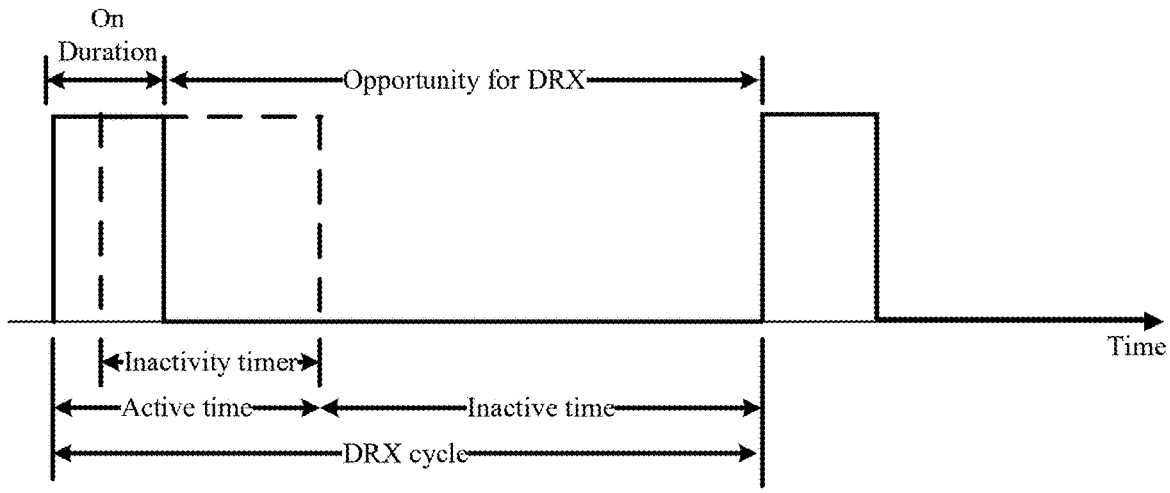
FIG. 1 (Prior Art)
201
Receive first downlink control information DCI
FIG. 2
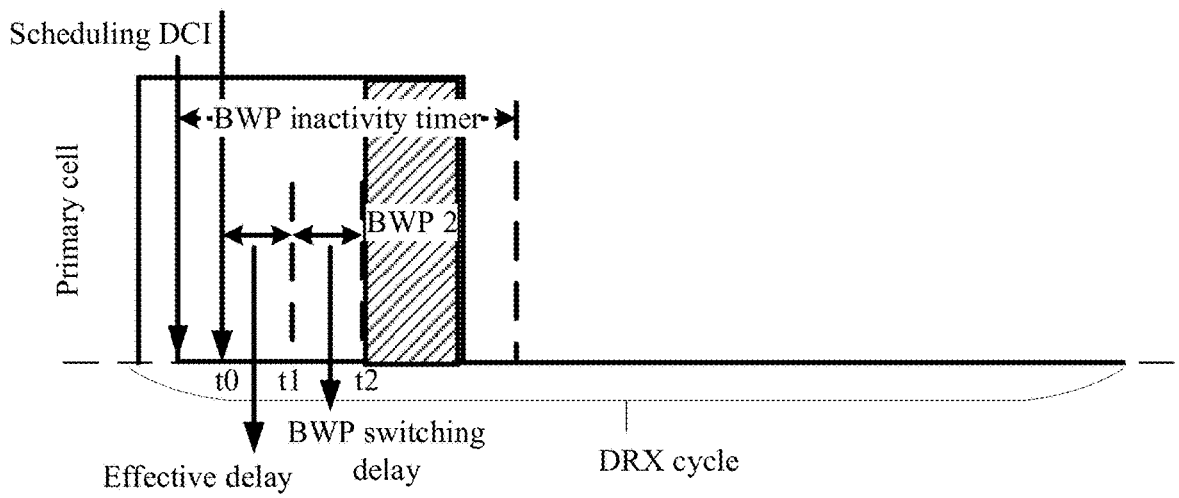
FIG. 3

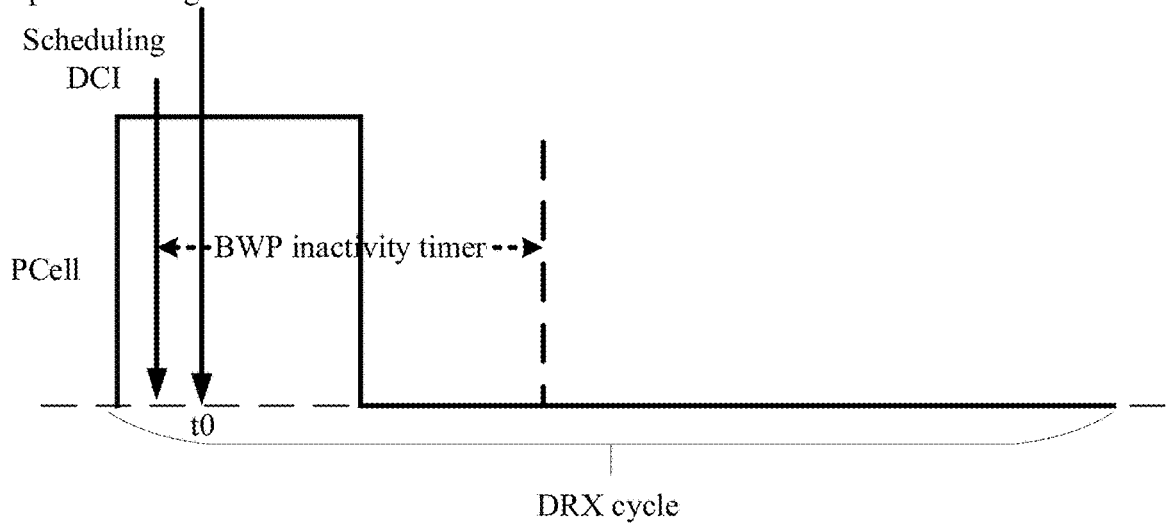
FIG. 4
Send first downlink control information DCI to a terminal — 501
FIG. 5
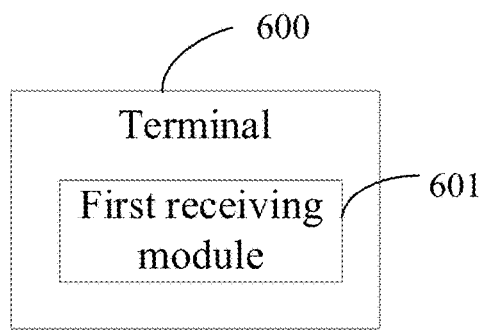
FIG. 6

METHOD FOR INDICATING POWER SAVING MODE, TERMINAL, AND NETWORK SIDE DEVICE

CROSS-REFERENCE TO RELATED APPLICATIONS

This application is a continuation of International Application No. PCT/CN2021/087732, filed on Apr. 16, 2021, which claims priority to Chinese Patent Application No. 202010323911.3, filed on Apr. 22, 2020. The entire contents of each of the above-identified applications are expressly incorporated herein by reference.

TECHNICAL FIELD

Embodiments of the present disclosure relate to the field of communications technologies, and in particular, to a method for indicating a power saving mode, a terminal, and a network side device.

BACKGROUND

After receiving newly transmitted and scheduled Downlink Control Information (DCI), a terminal starts or restarts a BandWidth Part (BWP) inactivity timer, to prolong duration in which the terminal monitors a Physical Downlink Control Channel (PDCCH). After the BWP inactivity timer times out, the terminal may be switched to a default value BWP. However, generally, in a network configuration, duration of the BWP inactivity timer is relatively long, and the terminal is in a PDCCH-only state in which no data is scheduled for a long time, thereby reducing BWP switching efficiency and increasing power consumption of the terminal.

SUMMARY

Embodiments of the present disclosure provide a method for indicating a power saving mode, a terminal, and a network side device.

According to a first aspect, an embodiment of the present disclosure provides a method for indicating a power saving mode. The method is applied to a terminal and includes:
  receiving first Downlink Control Information (DCI), where the first DCI is DCI that is not used for scheduling data, and the first DCI is used to indicate a first cell of the terminal to switch to or activate a target power saving mode.

According to a second aspect, an embodiment of the present disclosure provides a method for indicating a power saving mode. The method is applied to a network side device and includes:
  sending first DCI to a terminal, where the first DCI is DCI that is not used for scheduling data, and the first DCI is used to indicate a first cell of the terminal to switch to or activate a target power saving mode.

According to a third aspect, an embodiment of the present disclosure further provides a terminal, and the terminal includes:
  a first receiving module, configured to receive first DCI, where the first DCI is DCI that is not used for scheduling data, and the first DCI is used to indicate a first cell of the terminal to switch to or activate a target power saving mode.

According to a fourth aspect, an embodiment of the present disclosure further provides a network side device, and the network side device includes:
  a third sending module, configured to send first DCI to a terminal, where the first DCI is DCI that is not used for scheduling data, and the first DCI is used to indicate a first cell of the terminal to switch to or activate a target power saving mode.

According to a fifth aspect, an embodiment of the present disclosure further provides a terminal. The terminal includes a processor, a memory, and a computer program that is stored in the memory and that can be run on the processor, and when the computer program is executed by the processor, the steps of the foregoing method for indicating a power saving mode applied to the terminal are implemented.

According to a sixth aspect, an embodiment of the present disclosure further provides a network side device. The network side device includes a processor, a memory, and a computer program that is stored in the memory and that can be run on the processor, and when the computer program is executed by the processor, the steps of the foregoing method for indicating a power saving mode applied to the network side device are implemented.

According to a seventh aspect, an embodiment of the present disclosure further provides a readable storage medium. The readable storage medium stores a program or an instruction, and when the program or the instruction is executed by a processor, the steps of the foregoing method for indicating a power saving mode applied to the terminal or the steps of the foregoing method for indicating a power saving mode applied to the network side device are implemented.

In the embodiments of the present disclosure, a power saving mode indication field included in DCI that is not used for scheduling data indicates a first cell of a terminal to switch to or activate a target power saving mode, so that the terminal can quickly switch to or activate the target power saving mode, to improve efficiency of switching to or activating the power saving mode by the terminal and reduce power consumption of the terminal, thereby implementing power saving of the terminal.

BRIEF DESCRIPTION OF DRAWINGS

To describe the technical solutions in the embodiments of the present disclosure, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

FIG. 1 is a schematic diagram of a DRX cycle according to an embodiment of the present disclosure;

FIG. 2 is a first schematic flowchart of a method for indicating a power saving mode according to an embodiment of the present disclosure;

FIG. 3 is a first schematic diagram of power saving mode switching according to an embodiment of the present disclosure;

FIG. 4 is a second schematic diagram of power saving mode switching according to an embodiment of the present disclosure;

FIG. 5 is a second schematic flowchart of a method for indicating a power saving mode according to an embodiment of the present disclosure;

FIG. 6 is a first structural diagram of a terminal according to an embodiment of the present disclosure;

DETAILED DESCRIPTION

Figure 7:
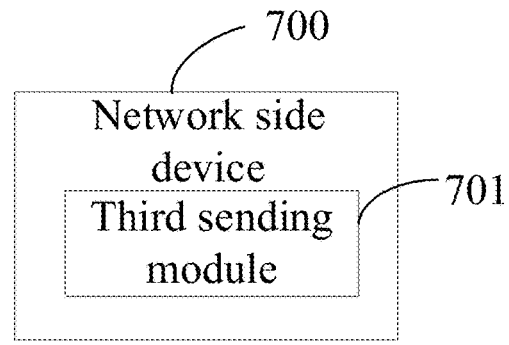
FIG. 7 is a first structural diagram of a network side device according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

For Ease of Understanding, the Following Describes Some Content in the Embodiments of the Present Disclosure.

I. Discontinuous Reception (DRX) of a Radio Resource Control (RRC) Connection state.

A basic DRX cycle is shown in FIG. 1. As shown in FIG. 1, a DRX cycle may include on duration and an opportunity for DRX. In the on duration, a terminal (also referred to as User Equipment (UE)) monitors and receives a Physical Downlink Control CHannel (PDCCH). In the opportunity for DRX, the UE does not monitor the PDCCH, thereby reducing power consumption.

If a newly transmitted PDCCH is received in the on duration, the terminal starts or restarts a BandWidth Part (BWP) inactivity timer to prolong duration in which the UE monitors a PDCCH.

The BWP inactivity timer is controlled by a Medium Access Control (MAC) layer, and this time is configured for only a default BWP. If there is new scheduling transmission during running of the timer, the timer is started or restarted. If a newly transmitted PDCCH is not received during running of the timer, a currently activated BWP is switched to the default BWP after expiry of the timer, that is, the currently activated BWP is set to the default BWP.

It should be noted that one DRX cycle may also include an active time and an inactive time (Outside Active Time). The active time of the DRX cycle is greater than or equal to the on duration of the DRX cycle. If the terminal starts or restarts the inactivity timer in a DRX cycle, the active time of the DRX cycle is greater than the on duration of the DRX cycle. In some embodiments, the active time of the cycle includes the on duration in the DRX cycle and a running time of the inactivity timer. If terminal does not start or restart the inactivity timer in a DRX cycle, the active time of the DRX cycle is equal to the on duration of the DRX cycle. For details, refer to FIG. 1.

2. DCP and Secondary Cell Dormancy Indication (SCell Dormancy Indication) of the Inactive Time.

A full name of the DCP is a DCI format 2_6 (DCI format 2_6 with CRC scrambled by PS-RNTI) for scrambled by a Power Saving-Radio Network Temporary Identifier (PS-RNTI).

To further save power in a DRX configuration, a network may further configure a DCP for UE in a configured DRX mechanism.

A wake-up indication in the DCP is used to indicate the UE whether to start an onduration timer in a next DRX cycle or the DCP is used to indicate the MAC layer whether to start an onduration timer in a next DRX cycle. Starting the timer means that the UE needs to monitor the PDCCH in the timer; otherwise, the UE does not need to monitor the PDCCH. The DCP can only be configured in a Primary cell (PCell). The DCI format 2_6 exists in the outside active time, that is, outside the active time. It should be noted that the DCP can be configured only when DRX is configured.

The DCI format 2_6 may include the following two information fields:

a wake-up indication field that is used to indicate the UE whether to start an onduration timer in a next DRX cycle and whose size is 1 bit; and a SCell dormancy indication field that is used to indicate a Secondary Cell (SCell) of the UE whether to execute a dormancy behavior in Carrier Aggregation (CA) and whose size may be 0, 1, 2, 3, 4, or 5 bits.

In addition, the SCell dormancy indication field in the DCI format 2_6 may indicate, in units of SCell groups, a SCell group whether to switch to a dormant BWP. Each bit in the field corresponds to one SCell group.

3. SCell Dormancy Indication in the Active Time.

Manner 1: A Physical Downlink Shared Channel (PDSCH) and a SCell dormancy indication are simultaneously scheduled by using DCI formats 1_1 and 0_1.

Manner 2: SCell dormancy indication is performed by using the DCI format 1_1 and the PDSCH is not scheduled.

In manner 2, dormancy indication may be performed by using the DCI format 1_1 by reusing the following scheduling related fields: a Modulation and Coding Scheme (MCS), a New Data Indication (NDI), a DeModulation Reference Signal (DMRS) sequence initialization, a Redundant Version (RV), a Hybrid Automatic Repeat reQuest (HARQ) process number, and an antenna port(s).

A bit size of the MCS is 5 bits, a bit size of the NDI is 1 bit, a bit size of the DMRS sequence initialization is 0 or 1 bit, a bit size of the RV is 2 bits, a bit size of the HARQ process number is 4 bits, and a bit size of the antenna port is at least 4 bits, for example, 4 to 6 bits.

4. BWP Switch Delay ($T_{BWPswitchDelay}$)

TABLE 1

| | | $T_{BWPswitchDelay}$ | |
|---|---|---|---|
| | New radio | $T_{BWPswitchDelay}$ (slot) | |
| μ | slot length (milliseconds) | BWP switching type 1 | BWP switching type 2 |
| 0 | 1 | 1 | 3 |
| 1 | 0.5 | 2 | 5 |
| 2 | 0.25 | 3 | 9 |
| 3 | 0.125 | 6 | 18 |

For $T_{BWPswitchDelay}$, refer to Table 1. As shown in Table 1, $T_{BWPswitchDelay}$ is related to μ, a New Radio (NR) slot length, and a BWP switching type, where μ is a smallest SCS between a SubCarrier Space (SCS) configuration of a Physical Downlink Control CHannel (PDCCH) of scheduling DCI and an SCS configuration of a Physical Uplink Control CHannel (PUCCH) that carries Hybrid Automatic Repeat reQuest ACKnowledgement (HARQ-ACK) information of DCI detection (μ is the smallest SCS configuration between the SCS configuration of the PDCCH providing the DCI and the SCS configuration of a PUCCH with the HARQ-ACK information in response to the detection of the DCI).

It should be noted that, for the BWP switching type 1 in Table 1, $T_{BWPswitchDelay}$ depends on a terminal capability (UE capability) ($T_{BWPswitchDelay}$ depends on UE capability). For the BWP switching type 2 in Table 1, if BWP switching involves a change of an SCS, a BWP switching delay is determined by a larger delay between an SCS before the switching and an SCS after the switching (If the BWP switch involves changing of SCS, the BWP switch delay is determined by the larger one between the SCS before BWP switch and the SCS after BWP switch).

The following describes the method for indicating a power saving mode in the embodiments of the present disclosure.

Referring to FIG. 2, FIG. 2 is a first schematic flowchart of a method for indicating a power saving mode according to an embodiment of the present disclosure. The method for indicating a power saving mode in this embodiment of the present disclosure is applied to a terminal. In actual application, the terminal may be a mobile phone, a tablet personal computer, a laptop computer, a Personal Digital Assistant (PDA), a Mobile Internet Device (MID), a wearable device, an in-vehicle device, or the like.

As shown in FIG. 2, the method for indicating a power saving mode applied to the terminal may include the following steps.

Step 201: Receive first downlink control information DCI.

The first DCI is DCI that is not used for scheduling data, and the first DCI is used to indicate a first cell of the terminal to switch to or activate a target power saving mode.

In some embodiments, the first DCI may explicitly or implicitly indicate the first cell of the terminal to switch to or activate the target power saving mode.

In some embodiments of this application, the first DCI is DCI that is not used for scheduling data, and the first DCI includes a power saving mode indication field, that is, the first DCI may indicate, by using the power saving mode indication field, to switch to or activate a power saving mode, but is not limited thereto.

In some embodiments, if the terminal currently has an activated power saving mode, the power saving mode indication field may indicate the first cell to switch to the target power saving mode; or if the terminal currently has no activated power saving mode, the power saving mode indication field may indicate the first cell to activate the target power saving mode.

For ease of understanding, an example is described as follows:

It is assumed that the target power saving mode is a power saving mode 1.

If the terminal has an activated power saving mode 2 before receiving the first DCI that is not used for scheduling data, after receiving the first DCI that is not used for scheduling data, the terminal may enable the first cell to switch or change from the power saving mode 2 to the power saving mode 1 according to the power saving mode indication field.

If the terminal has no activated power saving mode before receiving the first DCI that is not used for scheduling data, the terminal may activate the power saving mode 1 in the first cell after receiving the first DCI that is not used for scheduling data.

According to the method for indicating a power saving mode in this embodiment, a power saving mode indication field in first DCI that is not used for scheduling data indicates a first cell of a terminal to switch to or activate a target power saving mode, to improve efficiency of switching to or activating the power saving mode by the terminal, thereby implementing power saving of the terminal.

In the embodiment corresponding to FIG. 2, for example, after the receiving first DCI, the method may further include:

executing, at a target moment, a behavior indicated by the first DCI, where the target moment is:

a start moment of the $i^{th}$ time domain resource, where the terminal completes receiving of the first DCI in the $(i-1)^{th}$ time domain resource, and i is a positive integer; or a first moment, where there is an effective delay of the target power saving mode between the first moment and an end moment of the $(i-1)^{th}$ time domain resource, and the first moment is after the $(i-1)^{th}$ time domain resource.

In some embodiments, the executing, at a target moment, a behavior indicated by the first DCI is executing, at the target moment, the indication of the power saving mode indication field to enable the first cell of the terminal to switch to or activate the target power saving mode.

After receiving the first DCI, the terminal executes the indication of the power saving mode indication field to switch the first cell to the target power saving mode or activate the target power saving mode in the first cell.

However, it should be understood that, in some implementations, after receiving the first DCI, the terminal may not execute the behavior indicated by the power saving mode field. For example, when the terminal does not receive the first DCI or mistakenly detects the first DCI, the behavior indicated by the first DCI may not be executed.

The following describes the target moment in some embodiments.

Scenario 1: The target moment is the start moment of the $i^{th}$ time domain resource.

In some embodiments, the start moment of the $i^{th}$ time domain resource may be understood as a start moment of the first time domain resource after the first DCI is received.

In the scenario 1, after completing receiving of the first DCI in the $(i-1)^{th}$ time domain resource, the terminal may execute, at the start moment of the $i^{th}$ time domain resource, the behavior indicated by the first DCI, so that efficiency of switching to or activating a power saving mode can be further improved, thereby implementing power saving of the terminal.

In some embodiments, that receiving of the first DCI is completed may be understood as that the first DCI is received but decoding of the first DCI is not completed; or the first DCI is received and decoding of the first DCI is completed. A time domain resource may be an Orthogonal Frequency Division Multiplex (OFDM) symbol or a slot, but is not limited thereto.

For example, it is assumed that the terminal completes receiving of the first DCI in the second OFDM symbol in the third slot, the following implementations may be included:

In a first implementation, the terminal may execute, at a start moment of the third OFDM symbol in the third slot, the behavior indicated by the first DCI.

In a second implementation, if the terminal completes receiving of the first DCI in the second OFDM symbol in the third slot, and completes decoding of the first DCI in the third OFDM symbol in the third slot, the terminal may execute, at a start moment of the fourth OFDM symbol in the third slot, the behavior indicated by the first DCI.

In a third implementation, if the terminal completes receiving of the first DCI in the second OFDM symbol in the third slot, the terminal may execute, at the start moment of the first OFDM symbol in the fourth slot, the behavior indicated by the first DCI.

In a fourth implementation, if the terminal completes receiving of the first DCI in the second OFDM symbol in the third slot, and completes decoding of the first DCI in the third OFDM symbol in the third slot, the terminal may execute, at a start moment of the first OFDM symbol in the fourth slot, the behavior indicated by the first DCI.

Scenario 2: The target moment is the first moment, where there is the effective delay of the target power saving mode between the first moment and the end moment of the $(i-1)^{th}$ time domain resource, and the first moment is after the $(i-1)^{th}$ time domain resource.

In some embodiments, the first moment may be understood as a first moment after a time domain resource in which the first DCI is located, there is first duration between the first moment and an end moment of the time domain resource in which the first DCI is located, and the first duration is the effective delay of the target power saving mode.

In the scenario 2, after completing receiving of the first DCI, the terminal executes, only after the effective delay of the target power saving mode, the behavior indicated by the first DCI. In this way, the terminal may further process a retransmission and/HARQ feedback of previously scheduled data within the effective delay of the target power saving mode, thereby improving reliability of data transmission.

In some embodiments, during the effective delay of the target power saving mode, the terminal may keep working normally before the target power saving mode takes effect, that is, in a current effective power saving mode.

In some embodiments, the effective delay of the target power saving mode may include or not include a decoding time of the first DCI.

In some embodiments, the effective delay of the target power saving mode is configured by a network side device or stipulated by a protocol.

Further, in a case that the effective delay of the target power saving mode is configured by the network side device, the first DCI further includes an indication of the effective delay of the target power saving mode. That is, the first DCI may be used to simultaneously indicate to switch to or activate the target power saving mode and indicate the effective delay of the target power saving mode, thereby saving signaling overheads. It should be noted that the effective delay of the target power saving mode may be indicated by using the power saving mode indication field in the first DCI, or may be indicated by using an indication field other than the power saving mode indication field in the first DCI.

For example, a value of the effective delay of the target power saving mode is indicated by using an indication field PDSCH-to-HARQ feedback timing indicator in the first DCI. The value of the effective delay of the target power saving mode may be the same as or greater than or equal to a value of K1 indicated in the PDSCH-to-HARQ feedback timing indicator stipulated in the protocol. It should be noted that the value of the effective delay of the target power saving mode is not limited in the present disclosure.

It should be understood that, in some embodiments, in a case that the effective delay of the target power saving mode is configured by the network side device, the network side device may indicate the effective delay of the target power saving mode by using indication information other than the first DCI, thereby improving flexibility of information indication.

In some embodiments, the effective delay of the target power saving mode is related to any one of the following: a Hybrid Automatic Repeat reQuest ACKcknowledgement (HARQ-ACK) feedback processing delay, a maximum HARQ-ACK feedback retransmission delay, a product of a maximum number of retransmissions and a maximum retransmission delay, a bandwidth part BWP switching delay, a power saving mode switching capability of the terminal, and a power saving mode effective delay expected by the terminal. Detailed description is as follows.

a) In a case that the effective delay of the target power saving mode is related to the HARQ-ACK feedback processing delay, for example, the effective delay of the target power saving mode may be greater than or equal to the HARQ-ACK feedback processing delay. In this way, the terminal may further perform HARQ-ACK feedback processing in the effective delay of the target power saving mode, thereby improving reliability of data transmission.

Further, the HARQ-ACK feedback processing delay may be a HARQ-ACK feedback processing delay of second DCI, and the second DCI is a DCI format 1_1 that is not used for scheduling data and that includes a secondary cell dormancy indication, but is not limited thereto.

b) In a case that the effective delay of the target power saving mode is related to the maximum HARQ-ACK feedback retransmission delay, for example, the effective delay of the target power saving mode may be greater than or equal to the maximum HARQ-ACK feedback retransmission delay. In this way, the terminal may complete HARQ-ACK feedback retransmission within the effective delay of the target power saving mode, thereby improving reliability of data transmission.

c) In a case that the effective delay of the target power saving mode is related to the product of the maximum number of retransmissions and the maximum retransmission delay, for example, the effective delay of the target power saving mode may be greater than or equal to the product of the maximum number of retransmissions and the maximum retransmission delay. In this way, it can be ensured that the terminal completes data retransmission within the effective delay of the target power saving mode, thereby improving reliability of data transmission.

d) In a case that the effective delay of the target power saving mode is related to the BWP switching delay, for example, the effective delay of the target power saving mode may be greater than or equal to the BWP switching delay.

e) In a case that the effective delay of the target power saving mode is related to the power saving mode switching capability of the terminal, the effective delay of the target power saving mode may be configured by the network side device. In some embodiments, in one implementation, the terminal may report the power saving mode switching capability of the terminal to the network side device, so that the network side device determines the effective delay of the target power saving mode according to the power saving mode switching capability of the terminal reported by the terminal, and configures the effective delay of the target power saving mode for the terminal. In some embodiments, the terminal may determine a reference effective delay according to the power saving mode switching capability of the terminal, and report the reference effective delay to the network side device, so that the network side device determines the effective delay of the target power saving mode according to the reference effective delay, and configures the effective delay of the target power saving mode for the terminal. The effective delay of the target power saving mode configured by the network side device may be greater than or equal to the reference effective delay of the target power saving mode.

f) In a case that the effective delay of the target power saving mode is related to the power saving mode effective delay expected by the terminal, the effective delay of the target power saving mode may be configured by the network side device. In some embodiments, the terminal may report an expected target power saving mode effective delay, so that the network side device determines the effective delay of the target power saving mode according to the expected target power saving mode effective delay, and configures the effective delay of the target power saving mode for the terminal. The effective delay of the target power saving mode configured by the network side device may be greater than or equal to the expected effective delay of the target power saving mode.

It should be noted that in a scenario in which the terminal reports a target power saving mode switching capability of the terminal, a target power saving mode reference effective delay, or an expected target power saving mode effective delay of the terminal, the network side device may independently determine whether to determine the effective delay of the target power saving mode according to content reported by the terminal. That is, the effective delay that is of the target power saving mode and that is finally configured by the network side device may be determined based on the content reported by the terminal, or may not be determined based on the content reported by the terminal. For example, the terminal reports the expected target power saving mode effective delay of the terminal, but a target power saving mode effective delay finally configured by the network side device is equal to the BWP switching delay, and is not equal to the expected target power saving mode effective delay of the terminal.

In the embodiment corresponding to FIG. 2, the first DCI may indicate the target power saving mode in the following manners:

Manner 1: The first DCI may directly indicate the target power saving mode.

In an embodiment corresponding to FIG. 2, for example, the target power saving mode may be determined by at least one of the following parameters:

an identifier or an index of the target power saving mode, a target BWP, an effective delay of the target power saving mode, a number of transmit antennas or transmit channels, a number of receive antennas or receive channels, a maximum number of downlink Multiple-Input Multiple-Output (MIMO) layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a Physical Uplink Shared CHannel (PUSCH) scheduled by the PDCCH, a PDSCH processing delay, a PUSCH preparation delay, a COntrol REsource SET (CORESET), a search space set group, a search space, a PDCCH monitoring cycle, a PDCCH monitoring offset, PDCCH monitoring duration, a BWP bandwidth, a maximum uplink transmission rate, a maximum downlink transmission rate, a discontinuous reception DRX cycle, a number of Channel State Information (CSI) reports that are simultaneously processed by the terminal, a number of beam management reports that are simultaneously processed by the terminal, a number of measurement resources that are simultaneously received or processed by the terminal, a delay related to a CSI report, and a delay related to a beam management report.

The foregoing parameters are described below:

In some embodiments, the target BWP may be any one of the following: a dormant BWP, a default BWP, a first active BWP, a first non-dormant BWP, and a BWP configured by the terminal.

In some embodiments, the target BWP may be indicated by an identifier, an index, or the like. It should be understood that other parameters such as the CORESET, the search space set group, and the search space may also be indicated in a similar manner.

In actual application, the first active BWP may be an RRC configuration parameter. The first non-sleep BWP may be an RRC configuration parameter, such as first-non-dormant-BWP-ID-for-DCI-outside-active-time.

The time interval between the PDCCH and the HARQ-ACK that are of the first DCI is a HARQ-ACK feedback that is of the first DCI and that is sent by UE in the first slot following the time interval after the UE receives the PDCCH of the first DCI. In some embodiments, the time interval may be a time interval between the first DCI and an ACKnowledgement (ACK) thereof, or a time interval between the first DCI and a Negative ACKnowledgement (NACK) thereof.

For example, the time interval between the PDCCH and the HARQ-ACK that are of the first DCI is four slots. After completing receiving of the first DCI in the second OFDM symbol in the third slot, the terminal performs HARQ-ACK feedback of the first DCI in the eighth slot after four slots.

In manner 1, the first DCI may directly indicate the target power saving mode by carrying at least one of the foregoing parameters.

It should be noted that in actual application, the first DCI may indicate, by using only the power saving mode indication field, a behavior of indicating the first cell of the terminal to switch to or activate the target power saving mode, but a determining parameter of the target power saving mode may not be indicated by using the power saving mode indication field. That is, the determining parameter of the target power saving mode may be indicated by a field other than the power saving mode indication field in the first DCI.

For example, the target power saving mode is the target BWP. A network configures that the first DCI includes the target BWP, the effective delay of the target BWP, and the time interval between the PDCCH and the HARQ-ACK that are of the first DCI. By receiving the first DCI, the UE switches a currently activated BWP to the target BWP in the first slot after the effective delay according to the effective delay of the target BWP. In addition, a HARQ-ACK of the PDCCH of the first DCI is fed back in the first slot after the time interval according to the effective delay of the target BWP and the time interval between the PDCCH and the HARQ-ACK that are of the first DCI.

Manner 2: The first DCI may dynamically indicate, as the target power saving mode, one of the N power saving modes configured by the network side device.

In manner 2, for example, before the receiving first DCI, the method further includes:

receiving configuration information, where the configuration information is used to configure N power saving modes, and N is a positive integer; and the target power saving mode is one of the N power saving modes.

In some embodiments, after the network side device configures the N power saving modes by using the configuration information, the following implementations may be included:

In a first implementation, the network side device may directly dynamically indicate, by using the first DCI, that one of the N power saving modes is the target power saving mode.

In a second implementation, further, after the receiving configuration information and before the receiving first downlink control information DCI, the method further includes:

receiving first information, where the first information is used to activate K of the N power saving modes, and K is a positive integer less than or equal to N; and the target power saving mode is one of the K power saving modes.

In the second implementation, after configuring the N power saving modes by using the configuration information, the network side device may further activate the K of the N power saving modes by using the first information, and finally indicates, by using the first DCI, that one activated power saving mode in the K power saving modes is the target power saving mode.

In some embodiments, the configuration information may be RRC signaling, and the first information may be a Medium Access Control (MAC) Control Element (CE), but is not limited thereto.

In some embodiments, the power saving mode is determined by at least one of the following parameters:

an identifier or an index of the power saving mode, a target BWP, an effective delay of the power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP bandwidth, a maximum uplink transmission rate, a maximum downlink transmission rate, a DRX cycle, a number of channel state information CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

For related descriptions, refer to the descriptions in the target power saving mode. Details are not described herein again.

It should be noted that in actual application, determining parameters of different power saving modes in the N power saving modes may be the same or different. In a case that different power saving modes include a same determining parameter, values of the same determining parameter included in the different power saving modes may be the same or may be different.

In manner 2, in some embodiments, the N power saving modes configured by the network side device may be separately numbered, and the first DCI may indicate, in the following manner, the first cell to switch to or activate the target power saving mode:

(1) The first DCI or the power saving mode indication field in the first DCI carries the identifier or the index of the target power saving mode to indicate the terminal to activate or switch to the target power saving mode.

For example, the first DCI or the power saving mode indication field in the first DCI indicates that the index of the target power saving mode is 1. The index 1 of the target power saving mode corresponds to a power saving mode 1 configured by the network. The power saving mode 1 may be determined by the following parameters: the target BWP, the number of receive antennas, and the number of receive channels. After receiving the first DCI, the terminal switches to or activates the power saving mode 1, that is, switches to the target BWP. A current number of receive antennas and a current number of receive channels are set according to a configuration of the power saving mode 1.

(2) The first DCI may include the index of the target power saving mode and separately indicate a part of the parameters used to determine the target power saving mode.

For example, the first DCI or the power saving mode indication field in the first DCI indicates that the index of the target power saving mode is 1. In addition, the first DCI further indicates the number of receive antennas and the number of receive channels. The index 1 of the target power saving mode corresponds to a power saving mode 1 configured by the network. The power saving mode 1 is determined by the following parameter: the target BWP. After receiving the first DCI, the terminal switches to or activates the power saving mode 1, that is, switches to the target BWP. Then, a current number of receive antennas or receive channels is set according to the number of receive antennas and the number of receive channels that are indicated in the first DCI.

The following describes the first DCI.

In some embodiments, a feedback type of a HARQ-ACK of the first DCI is a dynamic codebook type, and the terminal feeds back the HARQ-ACK of the first DCI by using a first sub-codebook.

The first sub-codebook may transmit a HARQ-ACK feedback of the following information:

(1) In a serving cell in which PDSCH-code block group transmission (CodeBlockGroupTransmission) is configured, an SPS PDSCH release, an SPS PDSCH reception, and a Transport Block (TB)-based PDSCH reception (TB-based PDSCH receptions) scheduled by using a DCI format 1_0 are transmitted.

(2) In a cell in which no PDSCH-CodeBlockGroupTransmission is configured, a PDSCH data reception scheduled by using a DCI format 1_1 and a DCI format 1_0 is transmitted.

(3) A DCI format 1_1 that is not used for scheduling data and that includes a secondary cell dormancy indication.

In some embodiments, a value of a feedback bit of a HARQ-ACK of the first DCI is an acknowledgement ACK.

In some embodiments, a HARQ-ACK feedback processing delay of the first DCI is the same as a HARQ-ACK feedback processing delay of second DCI. The second DCI is DCI that is not used for scheduling data and that includes a secondary cell dormancy indication.

In some embodiments, after receiving N symbols after the last symbol of the first DCI, the UE feeds back HARQ-ACK information of the first DCI. If the network configures that the UE enables a PDSCH HARQ-ACK feedback processing type 2, a corresponding value of N in different $\mu$ is as follows: In the case of $\mu=0$, N=5; in the case of $\mu=1$, N=5.5;

and in the case of µ=2, N=11. Otherwise, in the case of µ=0, N=10; in the case of µ=10, N=12; in the case of µ=2, N=22; and in the case of µ=3, N=25 (A UE is expected to provide HARQ-ACK information in response to a detection of a DCI format 1_1 indicating power saving mode without scheduling PDSCH after N symbols from the last symbol of a PDCCH providing the DCI formant 1_1. If processing Type2Enabled of PDSCH-ServingCellConfig is set to enable for the serving cell with the PDCCH providing the DCI format 1_1, N=5 for µ=0, N=5.5 for µ=1, and N=11 for µ=2; otherwise, N=10 for µ=0, N=12 for µ=1, N=22 for µ=2 and N=25 for µ=3).

It should be noted that the value of N is not limited herein, that is, in different values of µ, the value of N may be different from the value of N in the foregoing example.

µ is a smallest SCS between a SubCarrier Space (SCS) configuration of a Physical Downlink Control CHannel (PDCCH) of the first DCI and an SCS configuration of a Physical Uplink Control CHannel (PUCCH) in which HARQ-ACK information of the first DCI is located (µ is the smallest SCS configuration between the SCS configuration of the PDCCH providing the DCI format 1_1 and the SCS configuration of a PUCCH with the HARQ-ACK information in response to the detection of the DCI format 1_1).

In another embodiment, the UE feeds back HARQ-ACK information of the first DCI after the ($T_{BWPswitchDelay}$+X) slots following a slot in which the last symbol of receiving the first DCI is located. $T_{BWPswitchDelay}$ is the BWP switching delay, and X is an interruption caused by BWP switching (A UE is expected to provide HARQ-ACK information in response to a DCI format 1-1 indicating SCell dormancy without scheduling PDSCH after $T_{BWPswitchDelay}$+X slots from the slot containing the last symbol of a PDCCH providing the power saving mode without scheduling PDSCH, where $T_{BWPswitchDelay}$ and X are the BWP switching delay and interruption length).

Another possible HARQ-ACK feedback delay of the first DCI is not excluded.

In some embodiments, the first DCI does not include a secondary cell dormancy indication. That is, the first DCI is DCI that is not used for scheduling data and that does not include a secondary cell dormancy indication. However, it should be noted that, in some implementations, the first DCI may be DCI that is not used for scheduling data and includes a secondary cell dormancy indication.

In some embodiments, the first DCI includes a power saving mode indication field, and the power saving mode indication field is used to indicate the first cell of the terminal to switch to or activate the target power saving mode; and the power saving mode indication field is a newly added field in the first DCI, or the power saving mode indication field reuses a target field of the first DCI.

For ease of understanding, specific descriptions are provided as follows:

Case 1: The power saving mode indication field is a newly added field in the first DCI.

Case 2: The power saving mode indication field reuses a target field of the first DCI.

In case 1, the power saving mode indication field may be considered as a field newly added to DCI to indicate power saving mode switching or activation. In case 2, the power saving mode indication field is an existing target field in DCI, but the target field may be reused to indicate power saving mode switching or activation.

In case 2, for example, the target field includes at least one of the following: a Modulation and Coding Scheme (MCS) indication field, a New Data Indication (NDI) indication field, a DMRS sequence initialization indication field, a Redundant Version (RV) indication field, a HARQ process number indication field, and an antenna port indication field.

It should be noted that the target field is only an example. In some embodiments, the target field may be another field in the DCI, such as another field not related to scheduling.

In the embodiment corresponding to FIG. 2, for example, after the receiving first DCI, the method further includes:

sending second information, where the second information is used to indicate whether the terminal receives the first DCI.

In some embodiments, the second information may be a MAC CE, but is not limited thereto.

In this way, the network side device may determine, according to the received second information, whether the terminal receives the first DCI, and performs a corresponding operation according to a determining result. For example, if the second information indicates that the terminal does not receive the first DCI, the network side device may re-deliver the first DCI to the terminal.

In the embodiment corresponding to FIG. 2, for example, before the receiving first DCI, the method further includes:

sending third information, where the third information indicates that the terminal has a capability of receiving the first DCI.

In some embodiments, the third information may be used to indicate whether the terminal has the capability of receiving the first DCI. However, the terminal may receive the first DCI only in a case that the third information indicates that the terminal has the capability of receiving the first DCI. Otherwise, the network side may send the first DCI to the terminal, to save signaling overheads.

In the embodiment corresponding to FIG. 2, for example, the first cell is any one of the following: all serving cells of the terminal, and any one or more serving cells of the terminal.

In some embodiments, any one or more serving cells of the terminal may be a Primary Cell (PCell) of the terminal and all Secondary Cell (SCell) of the terminal.

Further, all serving cells of the terminal may be all serving cells activated by the terminal, and all secondary cells of the terminal may be all secondary cells activated by the terminal.

In a case that the first cell includes a plurality of cells, an action object of the first DCI may include each cell in the first cell. In this case, when executing the behavior indicated by the first DCI, the terminal may switch each cell in the first cell to the target power saving mode, or activate the target power saving mode in each cell in the first cell.

In some embodiments, the first DCI may be sent and received only in a PCell, or may be sent or received in a SCell.

It can be understood that the target power saving mode or the N power saving modes configured by the network may be independently configured for each cell. Each cell may be configured with a different power saving mode.

It should be noted that the plurality of implementations described in this embodiment of the present disclosure may be implemented in combination with each other, or may be separately implemented. This is not limited in this embodiment of the present disclosure.

Embodiments of the present disclosure are intended to design DCI that is not used for scheduling data and that indicates BWP switching. A terminal may switch to a corresponding power efficiency or normal BWP (power saving mode switching) by receiving DCI that is not used for scheduling data. The DCI may further indicate a BWP switching effective delay. The terminal starts BWP switching after receiving the DCI and the specified effective delay. In this way, after receiving a PDSCH by using a large BWP, the terminal may quickly switch to the power efficiency BWP by receiving the DCI, thereby further implementing power saving. The BWP switching effective delay is increased to expect to perform BWP switching after retransmission of the previously scheduled PDSCH is processed.

(1) The terminal receives DCI, where the DCI includes a power saving mode indication field. The terminal switches to or changes to or activates a corresponding power saving mode according to a power saving mode indication in the power saving mode indication field.

(2) The DCI may be one or more of the following:
DCI that is not used for scheduling data; or
DCI that is not used for scheduling data and that includes a SCell dormancy indication.

(3) The power saving mode indication field includes a first configuration parameter.

(4) An indication range of the power saving mode indication field in the DCI may be one of the following: all serving cells, only a PCell, only all SCell, and one or more serving cells.

(5) Bits of the power saving mode indication field in the DCI may be obtained by reusing a scheduling-related field and/or another field in the DCI that is not used for scheduling data and/or the DCI that is not used for scheduling data and that includes a SCell dormancy indication.

(6) A HARQ-ACK feedback type of the DCI may be a dynamic codebook type, and a HARQ-ACK of the DCI is fed back by using a first sub-codebook.

(7) A feedback bit of the HARQ-ACK is an ACK.

(8) A processing time of a HARQ-ACK feedback of the DCI is consistent with a processing time of the DCI that is not used for scheduling data and that includes a SCell dormancy indication.

(9) After receiving the DCI, the terminal sends a MAC CE message, and indicates a base station UE to receive the DCI.

(10) The UE may report whether the DCI is supported or not.

(11) A network configures one or more power saving modes, each power saving mode includes a second configuration parameter, second configuration parameters of the power saving modes may be the same or different, and values of the second configuration parameters may be the same or different.

(12) On a basis of (11), a MAC CE activates K power saving modes configured by the network, and the DCI dynamically indicates one of the K power saving mode, or the DCI dynamically indicates one power saving mode configured by the network.

(13) A second configuration parameter included in the power saving mode indication field and a first configuration parameter included in the power saving mode may be one or more of the following:
a power saving mode ID;
an identifier ID of a target BWP, where the target BWP is dominant BWP, or a BWP with a smallest bandwidth, or a default BWP, or a first active BWP, or a first non-dormant BWP, or a BWP with a maximum bandwidth;
an effective delay of a power saving mode;
a number of transmit antennas or transmit channels;
a number of receive antennas or receive channels;
a maximum number of downlink MIMO layers;
a maximum number of uplink MIMO layers;
simultaneously activated uplink component carriers;
simultaneously activated downlink component carriers;
a time interval between a PDCCH and a PDSCH scheduled by the PDCCH;
a time interval between a PDSCH and an ACK or a NACK;
a time interval between a PDCCH and a PUSCH scheduled by the PDCCH;
a PDSCH processing delay;
a PUSCH preparation delay;
an index of a configured CORESET;
an index of a configured search space set group;
an index of a configured search space;
a PDCCH monitoring cycle;
a PDCCH monitoring offset;
PDCCH monitoring duration;
a BWP bandwidth;
a maximum uplink transmission rate;
a maximum downlink transmission rate;
a DRX cycle;
a number of CSI reports that are simultaneously processed by the terminal;
a number of beam management reports that are simultaneously processed by the terminal;
a number of measurement resources that are simultaneously received or processed by the terminal;
a delay related to a CSI report; and
a delay related to a beam management report.

(14) a value of the effective delay of the power saving mode may be one of the following:
a maximum HARQ-ACK feedback retransmission delay;
a maximum number of retransmissions×a maximum retransmission delay;
being greater than or equal to a BWP switching delay;
an effective delay of the power saving mode indication field reported by the UE to the base station according to a capability;
an effective delay of the power saving mode indication field configured by the network or stipulated by a protocol; and
another value.

(15) The terminal does not support or does not configure the SCell dormancy indication field in the DCI that is not used for scheduling.

For ease of understanding, an example is described as follows:

Embodiment 1: The network configures the DCI that is not used for scheduling and that indicates switching to a target power saving mode, where a configuration parameter in the DCI includes an ID of a target BWP and an effective delay of the indicated target power saving mode.

The UE has a serving cell, and the network configures a DRX mechanism for the UE.

The network configures, for the UE, DCI 1-1 that is not used for scheduling data and that includes an indication of switching to the target power saving mode. The DCI includes a configuration parameter: the ID (2 bits) of the target BWP and the effective delay (2 bits) of the target power saving mode.

The network configures a second configuration parameter included in the DCI: the effective delay of the power saving mode is a delay 0=1 slot and a delay 1=4 slots.

A bit indicating the target power saving mode in the DCI is "1001", which indicates that a BWP whose BWP ID is 2 is activated, and the effective delay of the power saving mode is the delay 1=4 slots. After receiving the DCI, the UE switches the BWP to a BWP 2 after the 4 slots. The BWP 2 is a small bandwidth BWP, and a user implements power saving by quickly switching to the small bandwidth BWP.

As shown in FIG. 3, the terminal receives, at t0, non-scheduling DCI that includes a power saving mode indication; starts a BWP switching operation at t1, where the switching operation is used to switch a serving cell of the UE to the BWP 2; and completes switching of the BWP at t2, where the BWP 2 starts to be activated. A power saving mode effective delay between t0 and t1 is 4 slots, and there is a BWP switching delay between t1 and t2.

Embodiment 2: The network configures a plurality of power saving modes and the DCI, and a configuration parameter in a power saving mode indication field in the DCI includes a power saving mode ID. A specified power saving mode is activated by using the DCI.

The UE has a serving cell, and the network configures a DRX mechanism for the UE.

The network configures five power saving modes and DCI 1-1 that is not used for scheduling data and that includes a power saving mode indication field. The power saving mode indication field in the DCI dynamically indicates to active a power saving mode, and a bit number of the power saving mode indication field is 3 bits.

The five power saving modes are as follows:
(0) The target BWP is the dormant BWP;
the effective delay of the power saving mode is 0;
the number of transmit antennas or transmit channels is 2 Tx;
the maximum number of downlink multiple-input multiple-output MIMO layers is 1; and
the index ID of the configured search space set group is 0.
(1) The target BWP is the BWP with the maximum bandwidth;
the effective delay of the power saving mode is equal to the BWP switching delay;
the number of transmit antennas or transmit channels is 4Tx;
the maximum number of downlink multiple-input multiple-output MIMO layers is 1; and
the index ID of the configured search space set group is 1.
(2) The target BWP is the first non-dormant BWP;
the effective delay of the power saving mode is the configured maximum number of retransmissions×the configured maximum retransmission delay;
the number of transmit antennas or transmit channels is 2 transmit (Tx);
the maximum number of downlink multiple-input multiple-output MIMO layers is 2; and
the PDCCH monitoring cycle is 5 slots;
the PDCCH monitoring offset is 0; and
The PDCCH monitoring duration is 2 slots.
(3) The target BWP is the default BWP;
the effective delay of the power saving mode is 0;
the number of transmit antennas or transmit channels is 2Tx;
the number of receive antennas or receive channels is 1Tx;
the maximum number of downlink MIMO layers is 1; and
the index ID of the configured search space set group is 0.
(4) The target BWP is the BWP with the minimum bandwidth;
the effective delay of the power saving mode is 0;
the number of transmit antennas or transmit channels is 1Tx; and
the index ID of the configured search space set group is 0.

As shown in FIG. 4, the terminal receives, at t0, non-scheduling DCI that includes a power saving mode indication, where a bit of the power saving mode indication field in the DCI is "100", which indicates that a power saving mode 3 is activated. After receiving the DCI, the UE immediately switches a BWP to a default BWP, receives a downlink by using 1Tx, and monitors a corresponding PDCCH according to a search space set group 0.

Embodiment 3: In combination with Embodiment 1 and Embodiment 2, the network configures a plurality of power saving modes and the DCI, and a configuration parameter in a power saving mode indication field of the DCI includes a power saving mode ID and another parameter (other than a parameter in the power saving mode). A specified power saving mode and another parameter are activated by using the DCI.

For example, the terminal receives non-scheduling DCI that includes a power saving mode indication. A bit of a power saving mode indication field in the DCI is "100", which indicates that a power saving mode 3 is activated. However, the DCI further includes an effective delay of the power saving mode indication field. After receiving the DCI, the terminal switches a BWP to a default BWP in the effective delay of the power saving mode indication field, receives a downlink by using 1Tx, and monitors a corresponding PDCCH according to a search space set group 0.

The embodiments of the present disclosure designs DCI that is not used for scheduling data and that indicates BWP switching, thereby implementing power saving of the terminal.

Referring to FIG. 5, FIG. 5 is a first schematic flowchart of a method for indicating a power saving mode according to an embodiment of the present disclosure. The method for indicating a power saving mode in this embodiment of the present disclosure is applied to a network side device. In actual application, the network side device may be a base station, a relay, an access point, or the like.

As shown in FIG. 5, the method for indicating a power saving mode applied to the network side device may include the following steps.

Step 501: Send first DCI to a terminal.

The first DCI is DCI that is not used for scheduling data, and the first DCI is used to indicate a first cell of the terminal to switch to or activate a target power saving mode.

According to the method for indicating a power saving mode in this embodiment, a power saving mode indication field included in DCI that is not used for scheduling data indicates a first cell of a terminal to switch to or activate a target power saving mode, so that the terminal can quickly switch to or activate the target power saving mode, to improve efficiency of switching to or activating the power saving mode by the terminal, thereby implementing power saving of the terminal.

In some embodiments, the method further includes:
sending fourth information to the terminal, where the fourth information is used to indicate an effective delay of the target power saving mode.

In some embodiments, the first DCI further includes information indicating an effective delay of the target power saving mode.

In some embodiments, the effective delay of the target power saving mode is related to any one of the following: a HARQ-ACK feedback processing delay, a maximum HARQ-ACK feedback retransmission delay, a product of a maximum number of retransmissions and a maximum retransmission delay, a BWP switching delay, a power saving mode switching capability of the terminal, and a power saving mode effective delay expected by the terminal.

In some embodiments, before the sending first DCI to a terminal, the method further includes:

sending configuration information to the terminal, where the configuration information is used to configure N power saving modes; and the target power saving mode is one of the N power saving modes, and N is a positive integer.

In some embodiments, after the sending configuration information to the terminal and before the sending first DCI to a terminal, the method further includes:

sending first information to the terminal, where the first information is used to activate K of the N power saving modes, and K is a positive integer less than or equal to N; and the target power saving mode is one of the K power saving modes.

In some embodiments, the power saving mode is determined by at least one of the following parameters:

an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target power saving mode is determined by at least one of the following parameters:

an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target BWP is any one of the following: a dormant BWP, a default BWP, a first active BWP, a first non-dormant BWP, and a BWP configured by the terminal.

In some embodiments, a feedback type of a HARQ-ACK of the first DCI is a dynamic codebook type, and the terminal feeds back the HARQ-ACK of the first DCI by using a first sub-codebook.

In some embodiments, a value of a feedback bit of a HARQ-ACK of the first DCI is an ACK.

In some embodiments, a HARQ-ACK feedback processing delay of the first DCI is the same as a HARQ-ACK feedback processing delay of second DCI; and the second DCI is DCI that is not used for scheduling data and that includes a secondary cell dormancy indication.

In some embodiments, the first DCI does not include a secondary cell dormancy indication.

In some embodiments, the first cell is any one of the following: all serving cells of the terminal, and any one or more serving cells of the terminal.

In some embodiments, the first DCI includes a power saving mode indication field, and the power saving mode indication field is used to indicate the first cell of the terminal to switch to or activate the target power saving mode; and the power saving mode indication field is a newly added field in the first DCI, or the power saving mode indication field reuses a target field of the first DCI.

In some embodiments, the target field includes at least one of the following: a MCS indication field, a NDI indication field, a DMRS sequence initialization indication field, a RV indication field, a HARQ process number indication field, and an antenna port indication field.

In some embodiments, after the sending first DCI to a terminal, the method further includes:

receiving second information sent by the terminal, where the second information is used to indicate whether the terminal receives the first DCI.

In some embodiments, before the sending first DCI to a terminal, the method further includes:

receiving third information sent by the terminal, where the third information indicates that the terminal has a capability of receiving the first DCI.

It should be noted that this embodiment is used as an implementation of the network side device corresponding to the foregoing method embodiment. Therefore, reference may be made to the related descriptions in the foregoing method embodiment, and a same beneficial effect can be achieved. To avoid repeated descriptions, details are not described herein again.

Referring to FIG. 6, FIG. 6 is a first structural diagram of a terminal according to an embodiment of the present disclosure. As shown in FIG. 6, a terminal 600 includes:

a first receiving module 601, configured to receive first downlink control information DCI, where the first DCI is DCI that is not used for scheduling data, and the first DCI is used to indicate a first cell of the terminal to switch to or activate a target power saving mode.

In some embodiments, the terminal 600 further includes:

an execution module, configured to execute, at a target moment, a behavior indicated by the first DCI, where the target moment is:

a start moment of the i$^{th}$ time domain resource, where the terminal completes receiving of the first DCI in the (i−1)$^{th}$ time domain resource, and i is a positive integer; or a first moment, where there is an effective delay of the target power saving mode between the first moment and an end moment of the (i−1)$^{th}$ time domain resource, and the first moment is after the (i−1)$^{th}$ time domain resource.

In some embodiments, the effective delay of the target power saving mode is configured by a network side device or stipulated by a protocol.

In some embodiments, in a case that the effective delay of the target power saving mode is configured by the network side device, the first DCI further includes an indication of the effective delay of the target power saving mode.

In some embodiments, the effective delay of the target power saving mode is related to any one of the following: a HARQ-ACK feedback processing delay, a maximum HARQ-ACK feedback retransmission delay, a product of a maximum number of retransmissions and a maximum retransmission delay, a BWP switching delay, a power saving mode switching capability of the terminal, and a power saving mode effective delay expected by the terminal.

In some embodiments, the terminal 600 further includes:
a second receiving module, configured to receive configuration information, where the configuration information is used to configure N power saving modes, and N is a positive integer; and
the target power saving mode is one of the N power saving modes.

In some embodiments, the terminal 600 further includes:
a third receiving module, configured to receive first information, where the first information is used to activate K of the N power saving modes, and K is a positive integer less than or equal to N; and
the target power saving mode is one of the K power saving modes.

In some embodiments, the power saving mode is determined by at least one of the following parameters:
an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target power saving mode is determined by at least one of the following parameters:
an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target BWP is any one of the following: a dormant BWP, a default BWP, a first active BWP, a first non-dormant BWP, and a BWP configured by the terminal.

In some embodiments, a feedback type of a HARQ-ACK of the first DCI is a dynamic codebook type, and the terminal feeds back the HARQ-ACK of the first DCI by using a first sub-codebook.

In some embodiments, a value of a feedback bit of a HARQ-ACK of the first DCI is an ACK.

In some embodiments, a HARQ-ACK feedback processing delay of the first DCI is the same as a HARQ-ACK feedback processing delay of second DCI; and
the second DCI is DCI that is not used for scheduling data and that includes a secondary cell dormancy indication.

In some embodiments, the first DCI does not include a secondary cell dormancy indication.

In some embodiments, the first cell is any one of the following: all serving cells of the terminal, and any one or more serving cells of the terminal.

In some embodiments, the first DCI includes a power saving mode indication field, and the power saving mode indication field is used to indicate the first cell of the terminal to switch to or activate the target power saving mode; and the power saving mode indication field is a newly added field in the first DCI, or the power saving mode indication field reuses a target field of the first DCI.

In some embodiments, the target field includes at least one of the following: a MCS indication field, a NDI indication field, a DMRS sequence initialization indication field, a RV indication field, a HARQ process number indication field, and an antenna port indication field.

In some embodiments, the terminal 600 further includes:
a first sending module, configured to send second information, where the second information is used to indicate whether the terminal receives the first DCI.

In some embodiments, the terminal 600 further includes:
a second sending module, configured to send third information, where the third information indicates that the terminal has a capability of receiving the first DCI.

The terminal 600 can implement the processes implemented by the terminal in the method embodiment of the present disclosure and achieve a same beneficial effect. To avoid repetition, details are not described herein again.

Referring to FIG. 7, FIG. 7 is a first structural diagram of a network side device according to an embodiment of the present disclosure. As shown in FIG. 7, a network side device 700 includes:

a third sending module 701, configured to send first DCI to a terminal, where the first DCI is DCI that is not used for scheduling data, and the first DCI is used to indicate a first cell of the terminal to switch to or activate a target power saving mode.

In some embodiments, the network side device 700 further includes:

a fourth sending module, configured to send fourth information to the terminal, where the fourth information is used to indicate an effective delay of the target power saving mode.

In some embodiments, the first DCI further includes information indicating an effective delay of the target power saving mode.

In some embodiments, the effective delay of the target power saving mode is related to any one of the following: a HARQ-ACK feedback processing delay, a maximum HARQ-ACK feedback retransmission delay, a product of a maximum number of retransmissions and a maximum retransmission delay, a BWP switching delay, a power saving mode switching capability of the terminal, and a power saving mode effective delay expected by the terminal.

In some embodiments, the network side device 700 further includes:

a fifth sending module, configured to send configuration information to the terminal, where the configuration information is used to configure N power saving modes; and the target power saving mode is one of the N power saving modes, and N is a positive integer.

In some embodiments, the network side device 700 further includes:

a sixth sending module, configured to send first information to the terminal, where the first information is used to activate K of the N power saving modes, and K is a positive integer less than or equal to N; and the target power saving mode is one of the K power saving modes.

In some embodiments, the power saving mode is determined by at least one of the following parameters:

an identifier or an index of the power saving mode, a target BWP, an effective delay of the power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target power saving mode is determined by at least one of the following parameters:

an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target BWP is any one of the following: a dormant BWP, a default BWP, a first active BWP, a first non-dormant BWP, and a BWP configured by the terminal.

In some embodiments, a feedback type of a HARQ-ACK of the first DCI is a dynamic codebook type, and the terminal feeds back the HARQ-ACK of the first DCI by using a first sub-codebook.

In some embodiments, a value of a feedback bit of a HARQ-ACK of the first DCI is an ACK.

In some embodiments, a HARQ-ACK feedback processing delay of the first DCI is the same as a HARQ-ACK feedback processing delay of second DCI; and the second DCI is DCI that is not used for scheduling data and that includes a secondary cell dormancy indication.

In some embodiments, the first DCI does not include a secondary cell dormancy indication.

In some embodiments, the first cell is any one of the following: all serving cells of the terminal, and any one or more serving cells of the terminal.

In some embodiments, the first DCI includes a power saving mode indication field, and the power saving mode indication field is used to indicate the first cell of the terminal to switch to or activate the target power saving mode; and the power saving mode indication field is a newly added field in the first DCI, or the power saving mode indication field reuses a target field of the first DCI.

In some embodiments, the target field includes at least one of the following: a MCS indication field, a NDI indication field, a DMRS sequence initialization indication field, a RV indication field, a HARQ process number indication field, and an antenna port indication field.

In some embodiments, the network side device 700 further includes:
a fourth receiving module, configured to receive second information sent by the terminal, where the second information is used to indicate whether the terminal receives the first DCI.

In some embodiments, the network side device 700 further includes:
a fifth receiving module, configured to receive third information sent by the terminal, where the third information indicates that the terminal has a capability of receiving the first DCI.

The network side device 700 can implement the processes implemented by the network side device in the method embodiment of the present disclosure and achieve a same beneficial effect. To avoid repetition, details are not described herein again.

Figure 8:
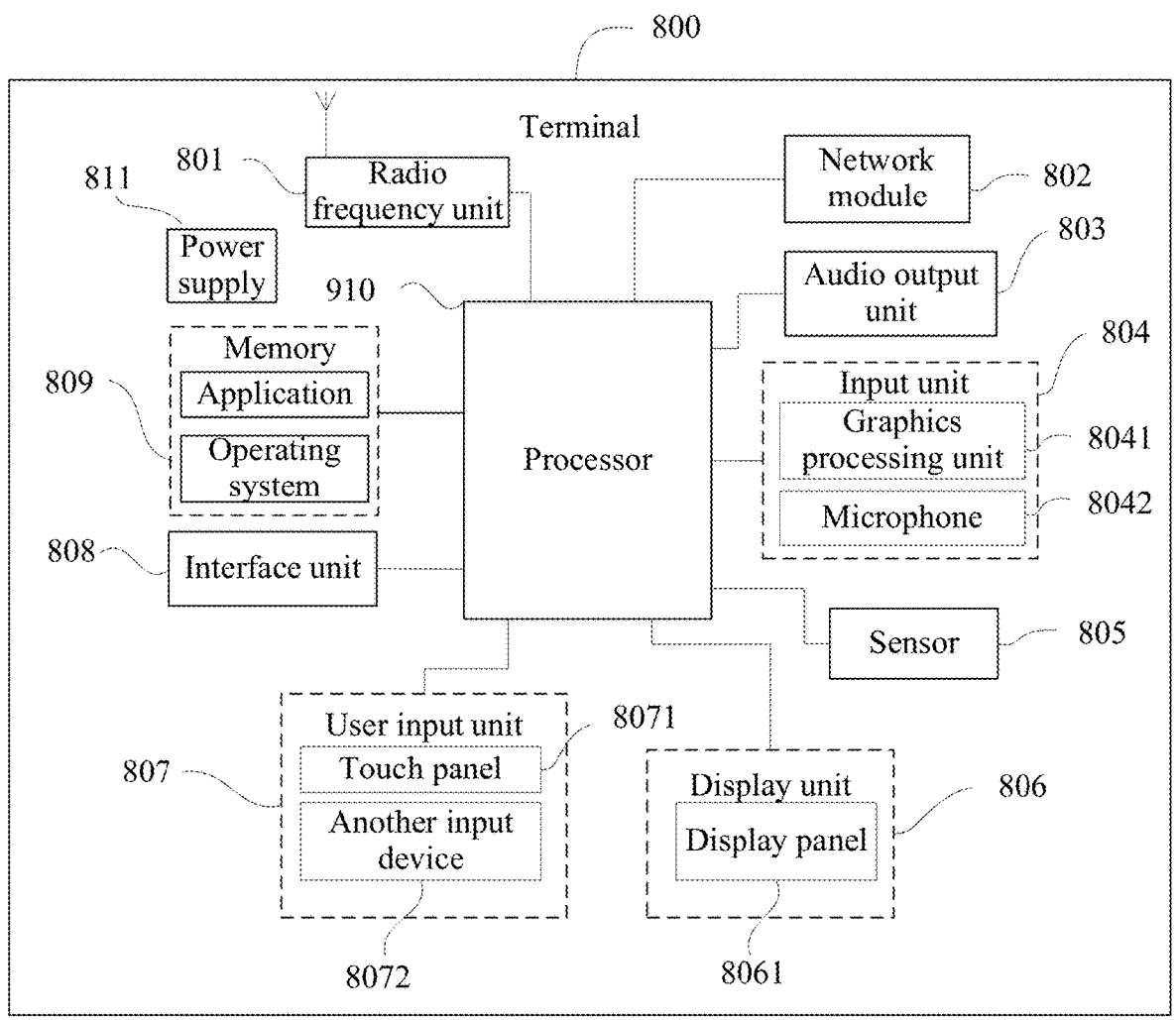
FIG. 8 is a second structural diagram of a terminal according to an embodiment of the present disclosure.

Referring to FIG. 8, FIG. 8 is a second structural diagram of a terminal according to an embodiment of the present disclosure. The terminal may be a schematic diagram of a hardware structure of a terminal that implements the embodiments of the present disclosure. As shown in FIG. 8, a terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. It can be understood by a person skilled in the art that, the terminal structure shown in FIG. 8 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a wearable device, a pedometer, and the like.

The radio frequency unit 801 is configured to:
receive first DCI, where the first DCI is DCI that is not used for scheduling data, and the first DCI is used to indicate a first cell of the terminal to switch to or activate a target power saving mode.

In some embodiments, the processor 810 is configured to execute, at a target moment, a behavior indicated by the first DCI, where the target moment is:
a start moment of the $i^{th}$ time domain resource, where the terminal completes receiving of the first DCI in the $(i-1)^{th}$ time domain resource, and i is a positive integer; or
a first moment, where there is an effective delay of the target power saving mode between the first moment and an end moment of the $(i-1)^{th}$ time domain resource, and the first moment is after the $(i-1)^{th}$ time domain resource.

In some embodiments, the effective delay of the target power saving mode is configured by a network side device or stipulated by a protocol.

In some embodiments, in a case that the effective delay of the target power saving mode is configured by the network side device, the first DCI further includes an indication of the effective delay of the target power saving mode.

In some embodiments, the effective delay of the target power saving mode is related to any one of the following: a HARQ-ACK feedback processing delay, a maximum HARQ-ACK feedback retransmission delay, a product of a maximum number of retransmissions and a maximum retransmission delay, a BWP switching delay, a power saving mode switching capability of the terminal, and a power saving mode effective delay expected by the terminal.

In some embodiments, the radio frequency unit 801 is further configured to receive configuration information, where the configuration information is used to configure N power saving modes, and N is a positive integer; and
the target power saving mode is one of the N power saving modes.

In some embodiments, the radio frequency unit 801 is further configured to receive first information, where the first information is used to activate K of the N power saving modes, and K is a positive integer less than or equal to N; and the target power saving mode is one of the K power saving modes.

In some embodiments, the power saving mode is determined by at least one of the following parameters:
an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target power saving mode is determined by at least one of the following parameters:
an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target BWP is any one of the following: a dormant BWP, a default BWP, a first active BWP, a first non-dormant BWP, and a BWP configured by the terminal.

In some embodiments, a feedback type of a HARQ-ACK of the first DCI is a dynamic codebook type, and the terminal feeds back the HARQ-ACK of the first DCI by using a first sub-codebook.

In some embodiments, a value of a feedback bit of a HARQ-ACK of the first DCI is an ACK.

In some embodiments, a HARQ-ACK feedback processing delay of the first DCI is the same as a HARQ-ACK feedback processing delay of second DCI; and the second DCI is DCI that is not used for scheduling data and that includes a secondary cell dormancy indication.

In some embodiments, the first DCI does not include a secondary cell dormancy indication.

In some embodiments, the first cell is any one of the following: all serving cells of the terminal, and any one or more serving cells of the terminal.

In some embodiments, the first DCI includes a power saving mode indication field, and the power saving mode indication field is used to indicate the first cell of the terminal to switch to or activate the target power saving mode; and the power saving mode indication field is a newly added field in the first DCI, or the power saving mode indication field reuses a target field of the first DCI.

In some embodiments, the target field includes at least one of the following: a MCS indication field, a NDI indication field, a DMRS sequence initialization indication field, a RV indication field, a HARQ process number indication field, and an antenna port indication field.

In some embodiments, the radio frequency unit 801 is further configured to send second information, where the second information is used to indicate whether the terminal receives the first DCI.

In some embodiments, the radio frequency unit 801 is further configured to send third information, where the third information indicates that the terminal has a capability of receiving the first DCI.

It should be noted that, the foregoing terminal 800 in this embodiment can implement the processes that can be implemented by the terminal in the method embodiment in the embodiments of the present disclosure. To avoid repetition, details are not described herein again.

It should be understood that, in this embodiment of the present disclosure, the radio frequency unit 801 may be configured to receive and send information or a signal in a call process. In some embodiments, after receiving downlink data from a base station, the radio frequency unit 801 sends the downlink data to the processor 810 for processing. In addition, the radio frequency unit 801 sends uplink data to the base station. Usually, the radio frequency unit 801 includes but is not limited to an antenna, at least one amplifier, a transceiver, a coupler, a low noise amplifier, a duplexer, and the like. In addition, the radio frequency unit 801 may communicate with a network and another device through a wireless communication system.

The terminal provides wireless broadband Internet access for the user by using the network module 802, for example, helping the user to send and receive an e-mail, brows a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received voice, or a message received voice) related to a specific function implemented by the terminal 800. The audio output unit 803 includes a speaker, a buzzer, a telephone receiver, and the like.

The input unit 804 is configured to receive an audio signal or a video signal. The input unit 804 may include a Graphics Processing Unit (GPU) 8041 and a microphone 8042, and the graphics processing unit 8041 processes image data of a still picture or video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The terminal 800 further includes at least one type of sensor 805, such as a light sensor, a motion sensor, and another sensor. In some embodiments, the light sensor includes an ambient light sensor and a proximity sensor. The ambient light sensor may adjust luminance of the display panel 8061 based on brightness of ambient light. The proximity sensor may turn off the display panel 8061 and/or backlight when the terminal 800 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by a user or information provided for a user. The display unit 806 may include a display panel 8061. The display panel 8061 may be configured in a form of a Liquid Crystal Display (LCD), an Organic Light-Emitting Diode (OLED), or the like.

The user input unit 807 may be configured to receive input numeral or character information, and generate key signal input related to user setting and functional control of the terminal. In some embodiments, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 810, and receives and executes a command sent by the processor 810. In addition, the touch panel 8071 may be of a resistive type, a capacitive type, an infrared type, a surface acoustic wave type, or the like. The user input unit 807 may include another input device 8072 in addition to the touch panel 8071. In some embodiments, the another input device 8072 may include but is not limited to a physical keyboard, a functional button (such as a volume control button or a power on/off button), a trackball, a mouse, and a joystick. Details are not described herein.

Further, the touch panel 8071 may cover the display panel 8061. When detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 8, although the touch panel 8071 and the display panel 8061 are used as two independent parts to implement input and output functions of the terminal, in some embodiments, the touch panel 8071 and the display panel 8061 may be integrated to implement the input and output functions of the terminal. This is not specifically limited herein.

The interface unit 808 is an interface for connecting an external apparatus with the terminal 800. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 808 may be configured to receive input (for example, data information and power) from an external apparatus and transmit the received input to one or more elements in the terminal 800 or may be configured to transmit data between the terminal 800 and an external apparatus.

The memory 809 may be configured to store a software program and various data. The memory 809 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 809 may include a high-speed random access memory, and may further include a nonvolatile memory, for example, at least one magnetic disk storage device, a flash storage device, or another volatile solid-state storage device.

The processor 810 is a control center of the terminal, and connects all parts of the entire terminal by using various interfaces and lines. By running or executing a software program and/or a module stored in the memory 809 and invoking data stored in the memory 809, the processor 810 performs various functions of the terminal and data processing, to perform overall monitoring on the terminal. The processor 810 may include one or more processing units. In some embodiments, an application processor and a modem processor may be integrated into the processor 810. The application processor mainly processes an operating system, a user interface, an application, and the like. The modem processor mainly processes wireless communications. It can be understood that, alternatively, the modem processor may not be integrated into the processor 810.

The terminal 800 may further include the power supply 811 (such as a battery) that supplies power to each component. In some embodiments, the power supply 811 may be logically connected to the processor 810 by using a power management system, so as to implement functions such as charging, discharging, and power consumption management by using the power management system.

In addition, the terminal 800 includes some function modules not shown, and details are not described herein.

For example, an embodiment of the present disclosure further provides a terminal, including a processor 810, a memory 809, and a computer program that is stored in the memory 809 and that can be run on the processor 810. When the computer program is executed by the processor 810, the processes of the foregoing embodiment of the method for indicating a power saving mode applied to the terminal are implemented and a same technical effect can be achieved. To avoid repetition, details are not described herein again.

Figure 9:
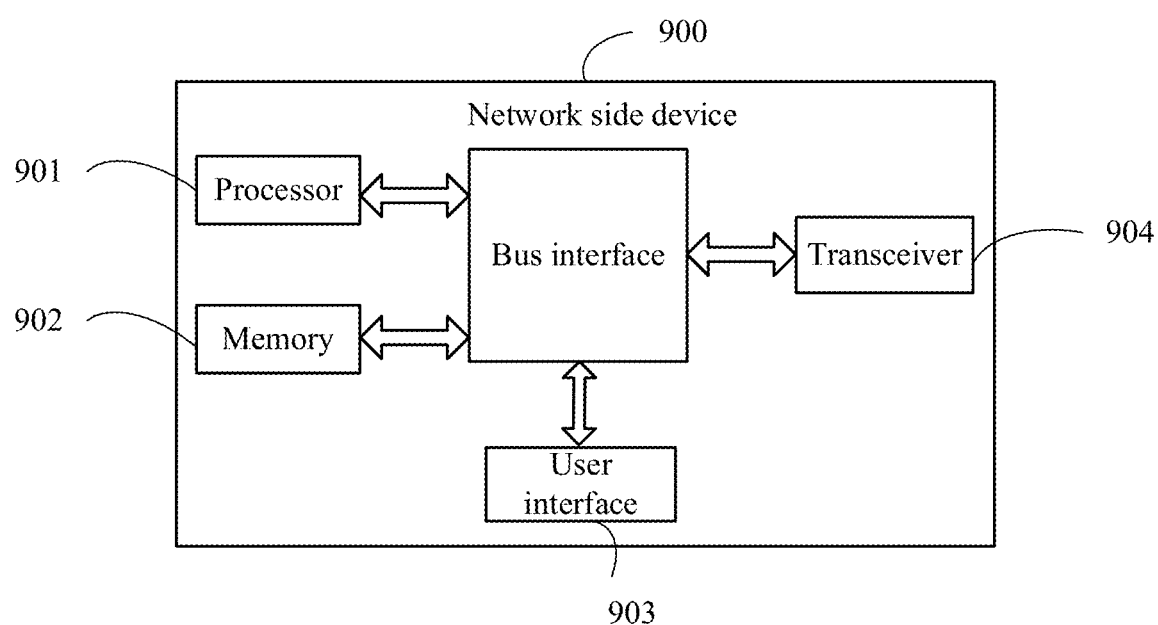
FIG. 9 is a second structural diagram of a network side device according to an embodiment of the present disclosure.

Referring to FIG. 9, FIG. 9 is a second structural diagram of a network side device according to an embodiment of the present disclosure. As shown in FIG. 9, a network side device 900 includes a processor 901, a memory 902, a user interface 903, a transceiver 904, and a bus interface.

In this embodiment of the present disclosure, the network side device 900 further includes a computer program that is stored in the memory 902 and that can be run on the processor 901, and when the computer program is executed by the processor 901, the following step is implemented:

sending first DCI to a terminal by using the transceiver 904, where the first DCI is DCI that is not used for scheduling data, and the first DCI is used to indicate a first cell of the terminal to switch to or activate a target power saving mode.

In some embodiments, when the computer program is executed by the processor 901, the following step is further implemented:

sending fourth information to the terminal by using the transceiver 904, where the fourth information is used to indicate an effective delay of the target power saving mode.

In some embodiments, the first DCI further includes information indicating an effective delay of the target power saving mode.

In some embodiments, the effective delay of the target power saving mode is related to any one of the following: a HARQ-ACK feedback processing delay, a maximum HARQ-ACK feedback retransmission delay, a product of a maximum number of retransmissions and a maximum retransmission delay, a BWP switching delay, a power saving mode switching capability of the terminal, and a power saving mode effective delay expected by the terminal.

In some embodiments, when the computer program is executed by the processor 901, the following step is further implemented: sending configuration information to the terminal by using the transceiver 904, where the configuration information is used to configure N power saving modes; and the target power saving mode is one of the N power saving modes, and N is a positive integer.

In some embodiments, when the computer program is executed by the processor 901, the following step is further implemented: sending first information to the terminal by using the transceiver 904, where the first information is used to activate K of the N power saving modes, and K is a positive integer less than or equal to N; and the target power saving mode is one of the K power saving modes.

In some embodiments, the power saving mode is determined by at least one of the following parameters:

an identifier or an index of the power saving mode, a target BWP, an effective delay of the power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target power saving mode is determined by at least one of the following parameters:

an identifier or an index of the target power saving mode, a target BWP, an effective delay of the target power saving mode, a number of transmit antennas or transmit channels, a number of receive antennas or receive channels, a maximum number of downlink MIMO layers, a maximum number of uplink MIMO layers, an uplink component carrier with a same active time, a downlink component carrier with a same active time, a time interval between a PDCCH and a PDSCH scheduled by the PDCCH, a time interval between a PDCCH and a HARQ-ACK that are of the first DCI, a time interval between a PDCCH and a PUSCH scheduled by the PDCCH, a PDSCH processing delay, a PUSCH preparation delay, a CORESET, a search space set group, a search space, a PDCCH monitoring cycle, a PDCCH monitoring offset, PDCCH monitoring duration, a BWP, a maximum uplink transmission rate, a maximum downlink transmission rate, a DRX cycle, a number of CSI reports that are simultaneously processed by the terminal, a number of beam management reports that are simultaneously processed by the terminal, a number of measurement resources that are simultaneously received or processed by the terminal, a delay related to a CSI report, and a delay related to a beam management report.

In some embodiments, the target BWP is any one of the following: a dormant BWP, a default BWP, a first active BWP, a first non-dormant BWP, and a BWP configured by the terminal.

In some embodiments, a feedback type of a HARQ-ACK of the first DCI is a dynamic codebook type, and the terminal feeds back the HARQ-ACK of the first DCI by using a first sub-codebook.

In some embodiments, a value of a feedback bit of a HARQ-ACK of the first DCI is an ACK.

In some embodiments, a HARQ-ACK feedback processing delay of the first DCI is the same as a HARQ-ACK feedback processing delay of second DCI; and the second DCI is DCI that is not used for scheduling data and that includes a secondary cell dormancy indication.

In some embodiments, the first DCI does not include a secondary cell dormancy indication.

In some embodiments, the first cell is any one of the following: all serving cells of the terminal, and any one or more serving cells of the terminal.

In some embodiments, the first DCI includes a power saving mode indication field, and the power saving mode indication field is used to indicate the first cell of the terminal to switch to or activate the target power saving mode; and the power saving mode indication field is a newly added field in the first DCI, or the power saving mode indication field reuses a target field of the first DCI.

In some embodiments, the target field includes at least one of the following: a MCS indication field, a NDI indication field, a DMRS sequence initialization indication field, a RV indication field, a HARQ process number indication field, and an antenna port indication field.

In some embodiments, when the computer program is executed by the processor 901, the following step is further implemented: receiving, by using the transceiver 904, second information sent by the terminal, where the second information is used to indicate whether the terminal receives the first DCI.

In some embodiments, when the computer program is executed by the processor 901, the following step is further implemented: receiving, by using the transceiver 904, third information sent by the terminal, where the third information indicates that the terminal has a capability of receiving the first DCI.

The network side device 900 can implement the processes implemented by the network side device in the foregoing method embodiment. To avoid repetition, details are not described herein again.

In FIG. 9, a bus architecture may include any quantity of interconnected buses and bridges. In some embodiments, various circuits of one or more processors represented by the processor 901 and a memory represented by the memory 902 are interconnected. The bus architecture may further link various other circuits such as a peripheral device, a voltage regulator, and a power management circuit. These are well known in the art, and therefore are not further described in this specification. A bus interface provides an interface. The transceiver 904 may be a plurality of components. To be specific, the transceiver 904 includes a transmitter and a receiver, and provides a unit configured to communicate with various other apparatuses on a transmission medium. For different user equipment, a user interface 903 may be an interface that can externally or internally connect to a needed device, and the connected device includes but is not limited to a keypad, a display, a loudspeaker, a microphone, and a joystick.

The processor 901 is responsible for bus architecture management and general processing. The memory 902 may store data used by the processor 901 when the processor 901 performs an operation.

An embodiment of the present disclosure further provides a readable storage medium. The readable storage medium stores a program or an instruction, and when the program or the instruction is executed by a processor, the processes of the foregoing embodiment of the method for indicating a power saving mode applied to the terminal or the network side device are implemented and a same technical effect can be achieved. To avoid repetition, details are not described herein again. The computer-readable storage medium includes a Read-only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for indicating a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A method for indicating a power saving mode, performed by a terminal, wherein the method comprises:
   receiving first Downlink Control Information (DCI), wherein the first DCI is DCI that is not used for scheduling data,
      wherein when the terminal has a currently-activated power saving mode, the first DCI is used to indicate a first cell of the terminal to switch from the currently-activated power saving mode to a target power saving mode in the first cell, or when the terminal has no currently-activated power saving mode, the first DCI is used to indicate the first cell of the terminal to activate the target power saving mode in the first cell;
   determining a target moment to be a start moment of an $i^{th}$ time domain resource, with the terminal completing receiving of the first DCI in an $(i-1)^{th}$ time domain resource, and i being a positive integer, or determining the target moment to be a first moment, with an effective delay of the target power saving mode being present between the first moment and an end moment of the $(i-1)^{th}$ time domain resource, and the first moment being after the $(i-1)^{th}$ time domain resource; and
   executing, at the target moment, a behavior indicated by the first DCI.

2. The method according to claim 1, wherein when the effective delay of the target power saving mode is configured by a network side device, the first DCI further comprises an indication of the effective delay of the target power saving mode.

3. The method according to claim 1, wherein the effective delay of the target power saving mode is related to any one of the following: a Hybrid Automatic Repeat reQuest-ACKnowledgment (HARQ-ACK) feedback processing delay, a maximum HARQ-ACK feedback retransmission delay, a product of a maximum number of retransmissions and a maximum retransmission delay, a BandWidth Part (BWP) switching delay, a power saving mode switching capability of the terminal, or a power saving mode effective delay expected by the terminal.

4. The method according to claim 1, wherein before the receiving first DCI, the method further comprises:
   receiving configuration information, wherein the configuration information is used to configure N power saving modes, and N is a positive integer; and
   wherein the target power saving mode is one of the N power saving modes.

5. The method according to claim 4, wherein after receiving configuration information and before receiving first DCI, the method further comprises:
   receiving first information, wherein the first information is used to activate K power saving modes of the N power saving modes, and K is a positive integer less than or equal to N; and
   the target power saving mode is one of the K power saving modes.

6. The method according to claim 1, wherein a value of a feedback bit of a Hybrid Automatic Repeat reQuest-ACKnowledgment (HARQ-ACK) of the first DCI is an ACKnowledgement (ACK).

7. The method according to claim 1, wherein a Hybrid Automatic Repeat reQuest-ACKnowledgment (HARQ-ACK) feedback processing delay of the first DCI is the same as a HARQ-ACK feedback processing delay of second DCI; and
   the second DCI is DCI that is not used for scheduling data and that comprises a secondary cell dormancy indication.

8. The method according to claim 1, wherein the first DCI comprises a power saving mode indication field,
   wherein when the terminal has the currently-activated power saving mode, the power saving mode indication field is used to indicate the first cell of the terminal to switch from the currently-activated power saving mode to the target power saving mode in the first cell, or when the terminal has no currently-activated power saving mode, the power saving mode indication field is used to indicate the first cell of the terminal to activate the target power saving mode in the first cell,
   wherein the power saving mode indication field is a newly added field in the first DCI, or the power saving mode indication field reuses a target field of the first DCI, and
   wherein the target field comprises at least one of the following: a Modulation and Coding Scheme (MCS) indication field, a New Data Indication (NDI) indication field, a DeModulation Reference Signal (DMRS) sequence initialization indication field, a Redundant Version (RV) indication field, a Hybrid Automatic Repeat reQuest (HARQ) process number indication field, or an antenna port indication field.

9. A method for indicating a power saving mode, performed by a network side device, wherein the method comprises:
   sending first Downlink Control Information (DCI) to a terminal, wherein the first DCI is DCI that is not used for scheduling data, wherein when the terminal has a currently-activated power saving mode, the first DCI is used to indicate a first cell of the terminal to switch from the currently-activated power saving mode to a target power saving mode in the first cell, or when the terminal has no currently-activated power saving mode, the first DCI is used to indicate the first cell of the terminal to activate the target power saving mode in the first cell; and sending information that indicates an effective delay of the target power saving mode to the terminal.

10. The method according to claim 9,
wherein the first DCI further comprises the information indicating the effective delay of the target power saving mode.

11. The method according to claim 10, wherein the effective delay of the target power saving mode is related to any one of the following: a Hybrid Automatic Repeat reQuest-ACKnowledgment (HARQ-ACK) feedback processing delay, a maximum HARQ-ACK feedback retransmission delay, a product of a maximum number of retransmissions and a maximum retransmission delay, a BandWidth Part (BWP) switching delay, a power saving mode switching capability of the terminal, or a power saving mode effective delay expected by the terminal.

12. The method according to claim 11, wherein before sending first DCI to the terminal, the method further comprises:
sending configuration information to the terminal, wherein the configuration information is used to configure N power saving modes; and
the target power saving mode is one of the N power saving modes, and N is a positive integer.

13. The method according to claim 12, wherein after sending configuration information to the terminal and before sending the first DCI to the terminal, the method further comprises:
sending first information to the terminal, wherein the first information is used to activate K power saving modes of the N power saving modes, and K is a positive integer less than or equal to N; and
the target power saving mode is one of the K power saving modes.

14. The method according to claim 9, wherein the first DCI comprises a power saving mode indication field,
wherein when the terminal has the currently-activated power saving mode, the power saving mode indication field is used to indicate the first cell of the terminal to switch from the currently-activated power saving mode to the target power saving mode in the first cell, or when the terminal has no currently-activated power saving mode, the power saving mode indication field is used to indicate the first cell of the terminal to activate the target power saving mode in the first cell,
wherein the power saving mode indication field is a newly added field in the first DCI, or the power saving mode indication field reuses a target field of the first DCI, and
wherein the target field comprises at least one of the following: a Modulation and Coding Scheme (MCS) indication field, a New Data Indication (NDI) indication field, a DeModulation Reference Signal (DMRS) sequence initialization indication field, a Redundant Version (RV) indication field, a Hybrid Automatic Repeat reQuest (HARQ) process number indication field, or an antenna port indication field.

15. A terminal, comprising:
a memory storing computer-readable instructions;
a processor coupled to the memory and configured to execute the computer-readable instructions, wherein the computer-readable instructions, when executed by the processor, cause the processor to perform operations comprising:
receiving first Downlink Control Information (DCI), wherein the first DCI is DCI that is not used for scheduling data,
wherein when the terminal has a currently-activated power saving mode, the first DCI is used to indicate a first cell of the terminal to switch from the currently-activated power saving mode to a target power saving mode in the first cell, or when the terminal has no currently-activated power saving mode, the first DCI is used to indicate the first cell of the terminal to activate the target power saving mode in the first cell;
determining a target moment to be a start moment of an $i^{th}$ time domain resource, with the terminal completing receiving of the first DCI in an $(i-1)^{th}$ time domain resource, and i being a positive integer, or determining the target moment to be a first moment, with an effective delay of the target power saving mode being present between the first moment and an end moment of the $(i-1)^{th}$ time domain resource, and the first moment being after the $(i-1)^{th}$ time domain resource; and
executing, at the target moment, a behavior indicated by the first DCI.

16. A network side device, comprising a processor, a memory, and a computer program that is stored in the memory and that is configured to be executed by the processor, wherein when the computer program is executed by the processor, the method for indicating the power saving mode according to claim 9 is implemented.

17. The terminal according to claim 15, wherein when the effective delay of the target power saving mode is configured by a network side device, the first DCI further comprises an indication of the effective delay of the target power saving mode.

18. The terminal according to claim 15, wherein the effective delay of the target power saving mode is related to any one of the following: a Hybrid Automatic Repeat reQuest-ACKnowledgment (HARQ-ACK) feedback processing delay, a maximum HARQ-ACK feedback retransmission delay, a product of a maximum number of retransmissions and a maximum retransmission delay, a BandWidth Part (BWP) switching delay, a power saving mode switching capability of the terminal, or a power saving mode effective delay expected by the terminal.

19. The terminal according to claim 15, wherein the operations further comprise determining the target power saving mode based on at least one of the following parameters:
an identifier or an index of the target power saving mode, a target BandWidth Part (BWP), the effective delay of the target power saving mode, a number of transmit antennas or transmit channels, a number of receive antennas or receive channels, a maximum number of downlink Multiple-Input Multiple-Output (MIMO) layers, a maximum number of uplink MIMO layers, an uplink component carrier with a same active time, a downlink component carrier with a same active time, a time interval between a Physical Downlink Control CHannel (PDCCH) and a Physical Downlink Shared CHannel (PDSCH) scheduled by the PDCCH, a time interval between a PDCCH and a Hybrid Automatic Repeat reQuest-ACKnowledgment (HARQ-ACK) that are of the first DCI, a time interval between a PDCCH and a Physical Uplink Shared CHannel (PUSCH) scheduled by the PDCCH, a PDSCH processing delay, a PUSCH preparation delay, a COntrol REsource SET (CORESET), a search space set group, a search space, a PDCCH monitoring cycle, a PDCCH monitoring offset, PDCCH monitoring duration, a BWP bandwidth, a maximum uplink transmission rate, a maximum downlink transmission rate, a Discontinuous Reception (DRX) cycle, a number of Channel State Information (CSI) reports that are simultaneously processed by the terminal, a number of beam management reports that are simultaneously processed by the terminal, a number of measurement resources that are simultaneously received or processed by the terminal, a delay related to a CSI report, or a delay related to a beam management report.

20. The method according to claim 1, further comprising determining the target power saving mode based on at least one of the following parameters:

an identifier or an index of the target power saving mode, a target BandWidth Part (BWP), the effective delay of the target power saving mode, a number of transmit antennas or transmit channels, a number of receive antennas or receive channels, a maximum number of downlink Multiple-Input Multiple-Output (MIMO) layers, a maximum number of uplink MIMO layers, an uplink component carrier with a same active time, a downlink component carrier with a same active time, a time interval between a Physical Downlink Control CHannel (PDCCH) and a Physical Downlink Shared CHannel (PDSCH) scheduled by the PDCCH, a time interval between a PDCCH and a Hybrid Automatic Repeat reQuest-ACKnowledgment (HARQ-ACK) that are of the first DCI, a time interval between a PDCCH and a Physical Uplink Shared CHannel (PUSCH) scheduled by the PDCCH, a PDSCH processing delay, a PUSCH preparation delay, a Control REsource SET (CORESET), a search space set group, a search space, a PDCCH monitoring cycle, a PDCCH monitoring offset, PDCCH monitoring duration, a BWP bandwidth, a maximum uplink transmission rate, a maximum downlink transmission rate, a Discontinuous Reception (DRX) cycle, a number of Channel State Information (CSI) reports that are simultaneously processed by the terminal, a number of beam management reports that are simultaneously processed by the terminal, a number of measurement resources that are simultaneously received or processed by the terminal, a delay related to a CSI report, or a delay related to a beam management report.

* * * * *